(12) United States Patent
Cottom

(10) Patent No.: US 8,544,490 B2
(45) Date of Patent: Oct. 1, 2013

(54) VALVE

(75) Inventor: Ian Martin Cottom, Redditch (GB)

(73) Assignee: Haldex Brake Products Ltd. (GB)

( * ) Notice: Subject to any disclaimer, the term of this patent is extended or adjusted under 35 U.S.C. 154(b) by 1129 days.

(21) Appl. No.: 12/031,854

(22) Filed: Feb. 15, 2008

(65) Prior Publication Data
US 2008/0163932 A1 Jul. 10, 2008

Related U.S. Application Data

(63) Continuation of application No. PCT/GB2006/002989, filed on Aug. 10, 2006.

(30) Foreign Application Priority Data
Aug. 16, 2005 (GB) .................................. 0516741.6

(51) Int. Cl.
F16K 15/14 (2006.01)
(52) U.S. Cl.
USPC .............................. 137/102; 137/843; 303/69
(58) Field of Classification Search
USPC ............................ 137/102, 107, 843; 303/69
See application file for complete search history.

(56) References Cited

U.S. PATENT DOCUMENTS

| 1,506,012 | A | * | 8/1924 | Lewis | 137/843 |
| 3,285,267 | A | | 11/1966 | Groth | |
| 3,424,185 | A | | 1/1969 | Lansky et al. | |
| 5,218,993 | A | * | 6/1993 | Steinberg et al. | 137/843 |
| 6,105,609 | A | * | 8/2000 | Polidan et al. | 137/843 |

FOREIGN PATENT DOCUMENTS

| GB | 680947 | 10/1952 |
| GB | 2268574 A | 1/1994 |
| GB | 2416010 A | 1/1994 |
| WO | 9938744 A1 | 8/1999 |

OTHER PUBLICATIONS

International Search Report, Oct. 16, 2006, 3 pages.
United Kingdom Search Report, Dec. 15, 2005, 1 page.

* cited by examiner

Primary Examiner — John Fox
(74) Attorney, Agent, or Firm — St. Onge Steward Johnston & Reens LLC

(57) ABSTRACT

A valve comprising an inlet port, an outlet port, an exhaust port and a diaphragm disposed between the inlet and exhaust ports which is moveable, in response to air pressure within the valve, between a first position in which it seals the exhaust port and a second position in which the exhaust port is open, there being one or more projections associated with the exhaust port on which the diaphragm is able to rest in its first position.

7 Claims, 2 Drawing Sheets

VALVE

CROSS-REFERENCE TO RELATED APPLICATIONS

The present application is a continuation of pending International patent application PCT/GB2006/002989 filed on Aug. 10, 2006 which designates the United States and claims priority from the United Kingdom patent application 0516741.6 filed on Aug. 16, 2005, the content of which is incorporated herein by reference.

FIELD OF THE INVENTION

The present invention relates to a valve, particularly, though not exclusively, to a quick release valve for a vehicle braking system.

BACKGROUND OF THE INVENTION

It is known for large or heavy vehicles such as buses, coaches and heavy goods vehicles (HGVs) to be provided with brake actuators having a service brake for deceleration when the vehicle is in motion and a parking brake to hold the vehicle stationary. The service brake is usually pneumatically actuated, and the parking brake is usually spring-actuated, with a pneumatic system being provided to maintain the parking brake in an unactuated condition when it is not required.

In some such vehicles, notably trailers for HGVs, the parking brake also acts as an emergency brake which can be used to decelerate and stop the vehicle automatically in the event of failure of the service brake, for example if the supply of compressed air to the service brake is interrupted or disconnected. In order to do this, a quick release valve (QRV) is provided which allows the rapid release of air from the parking brake system to actuate the parking brake. One such quick release valve is disclosed in the applicants' co-pending UK patent application, no. 0415324.3, and includes a moveable disc or diaphragm with a resiliently deformable skirt disposed between an upper inlet port and a lower exhaust port, with an outlet port being provided to one side of and beneath the exhaust valve. When the parking brake is not required, compressed air is supplied through the inlet port of the QRV, creating pressure on the diaphragm such that it seals the exhaust port, whilst the skirt flexes to allow the compressed air to pass from the inlet port to the outlet port. When the parking brake is required, for example if the vehicle is parked, or if the supply of compressed air has been disconnected, the disc moves to seal the inlet port, allowing air to flow from the outlet port to the exhaust port, thus causing the parking brake to be actuated.

The applicants have found that, whilst QRVs of this type are generally effective, there can be a delay, sometimes of up to fifteen seconds, between the supply of compressed air being disconnected from the inlet port and the parking brake being actuated, as the moveable disc and resiliently deformable skirt sometimes move in an unpredictable fashion, leaving the exhaust outlet of the QRV sealed. Although this is not a concern when the vehicle is stationary, in an emergency situation such a delay may be dangerous.

Thus, it is an object of the present invention to provide a quick release valve which eliminates, or at least reduces, this delay.

SUMMARY OF THE INVENTION

In accordance with a first aspect of the present invention, there is provided a valve comprising an inlet port, an outlet port, an exhaust port and a diaphragm disposed between the inlet and exhaust ports which is moveable, in response to air pressure within the valve, between a first position in which it seals the exhaust port and a second position in which the exhaust port is open, there being one or more projections associated with the exhaust port on which the diaphragm is able to rest in its first position.

The provision of the projections on which the diaphragm is able to rest enables the diaphragm to move between its first and second positions in response to a change in pressure within the valve substantially without any delay caused by a difference in pressure on one face of the diaphragm in relation to another face.

The valve may comprise a body. The outlet port may be positioned on the periphery of the body. The projections may comprise ribs extending axially from the exhaust port. The projections may further comprise arc sections disposed at distal ends of the ribs. This ensures that the diaphragm is adequately supported in its first position.

The exhaust port may be located generally opposite the inlet port. The exhaust port may be located above the inlet port. This ensures that when compressed air enters the valve through the inlet port, the exhaust port is sealed by the diaphragm.

The diaphragm may be resiliency deformable. Alternatively, the diaphragm may comprise a generally rigid central portion with a resiliently deformable skirt. This ensures that, in its first position, the diaphragm forms an air-tight seal over the exhaust outlet.

The diaphragm may be generally circular.

The valve may comprise two parts, with the inlet port being provided on one part and the exhaust port being provided on the other part.

According to a second aspect of the present invention, there is provided a braking system for a vehicle incorporating a valve according to the first aspect of the invention.

The valve may be in accordance with any of the preceding paragraphs.

BRIEF DESCRIPTION OF THE DRAWINGS

Specific and non-limiting embodiments of the invention, in its various aspects, will now be described in greater detail, strictly by way of example only, by reference to the accompanying drawings, of which.

DETAILED DESCRIPTION OF THE INVENTION

Figure 1:
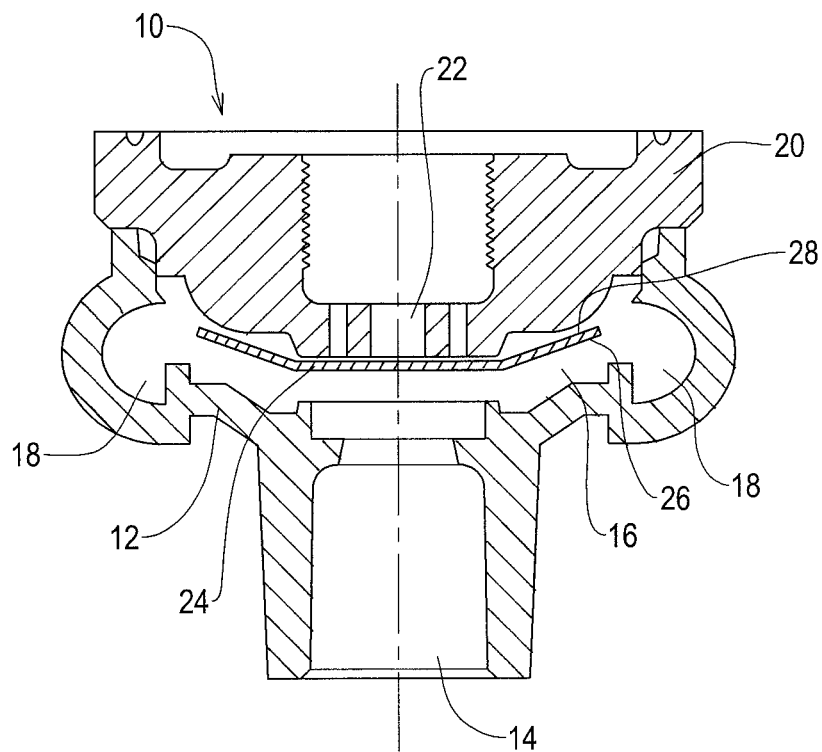
FIG. 1 is a cutaway perspective view of a known quick release valve.

Turning firstly to FIG. 1, a known quick release valve (QRV) for a pneumatic braking system for a vehicle is shown generally at 10. The valve 10 comprises a body 12 cast or otherwise manufactured from steel or any other suitable material having an inlet port 14 through which compressed air is able to enter an inner chamber 16, with outlet ports 18, which are in fluid communication with the inner chamber 16, being disposed around the periphery of the body 12. A separate exhaust part 20, having an exhaust port 22, is received in air-tight engagement in an open part of the body 12, with the exhaust port being located generally opposite and above the inlet port 14, in fluid communication with the inner chamber 16. A moveable diaphragm 24, which may be resiliently deformable or may comprise a generally rigid central portion with a resiliently deformable skirt, is disposed within the inner chamber 16, between the inlet port 14 and the exhaust port 22.

In use, the valve 10 forms part of a braking system for a vehicle such as a coach or HGV. The braking system includes brake actuators of known kind having a pneumatically-actuated service brake for deceleration when the vehicle is in motion and a spring-actuated parking brake to hold the vehicle stationary, or to halt the vehicle in the event of an emergency such as failure of the service brake. The parking brake uses a piston which is biased towards an actuated condition by a spring, and which is maintained in an unactuated condition by compressed air when the parking brake is not required. The quick release valve 10 is part of a pneumatic system to control the operation of the parking brake. The inlet port 14 is connected to a source of compressed air, which is controlled by a driver of the vehicle. The outlet ports 18 are connected to inlet ports on the brake actuators to control the operation of the parking brake piston. In normal operation, the parking brake is disengaged by supplying compressed air to the actuators through the quick release valve 10. The compressed air enters the inner chamber 16 of the quick release valve 10 through the inlet port 14, causing the diaphragm 24 to move and its edges to deform, creating an air-tight seal over and around the exhaust port 22. This deformation of the diaphragm 24 around the exhaust port 22 leaves the outlet ports 18 free, allowing the air to escape into the brake actuators, thus causing the parking brake to become disengaged.

When the parking brake is required, the supply of compressed air to the quick release valve 10 is halted. This causes the diaphragm 24 move to a position over the inlet port 14, allowing air to pass from the outlet ports 18 and escape through the exhaust port 22. As the air escapes from the quick release valve 10, the air pressure within the brake actuators drops, causing the parking brake to be actuated. It will be appreciated that the supply of compressed air can be halted either deliberately by a driver of the vehicle, or in the event of an emergency, for example if the pneumatic system were to fail, leading to a loss in air pressure. In this instance, the quick release valve 10 would operate, causing the vehicle to come to a halt.

Although this system is generally effective, the applicants have found that there can be a delay of up to fifteen seconds between the supply of compressed air being halted and the parking brake being actuated. This is because when the supply of compressed air entering the quick release valve 10 at the inlet port 14 is halted, the air escaping from the outlet ports 18 is directed over both a lower face 26 and an upper face 28 of the diaphragm 24. As the diaphragm 24 is deformed, the lower face 26 has a greater surface area than the upper face. The pressure of the air passing over the lower face 26 of the diaphragm 24 urges the diaphragm towards the exhaust port 22, thus preventing the escape of air through the exhaust port 22. It is only when the pressure of the air passing over the upper face 28 of the diaphragm 24 is greater than that on the lower face 26, which can take an unacceptably long period of time to occur, that the diaphragm 24 can move into a position where the inlet port 14 is obscured and the exhaust port 22 is free, allowing air to escape through the exhaust port. Thus, actuation of the parking brake may be delayed.

Figure 2:
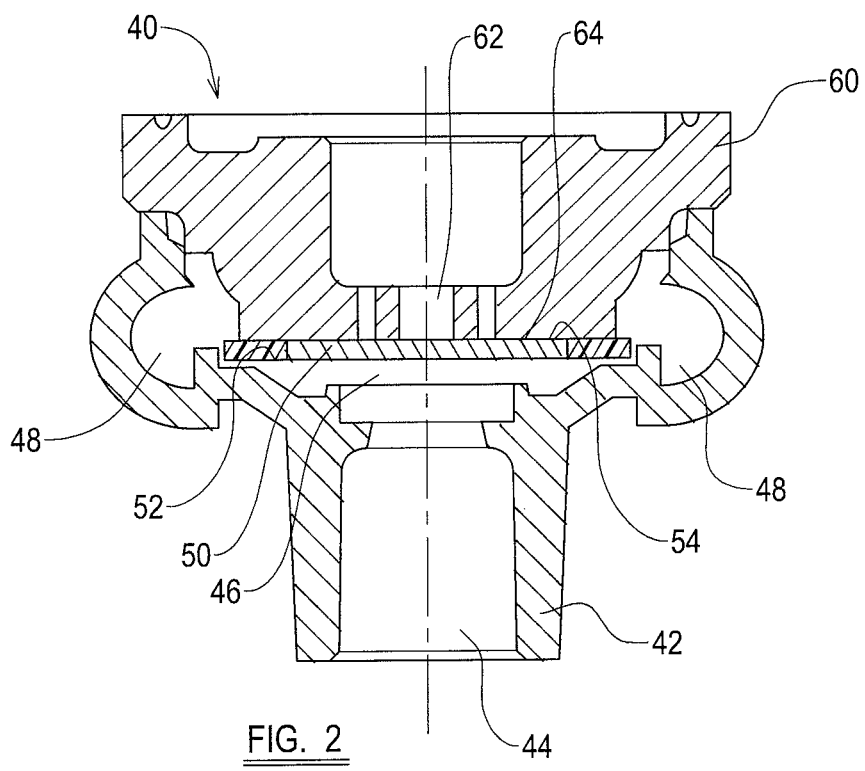
FIG. 2 is a cutaway perspective view of a valve according to the present invention.
Figure 3:
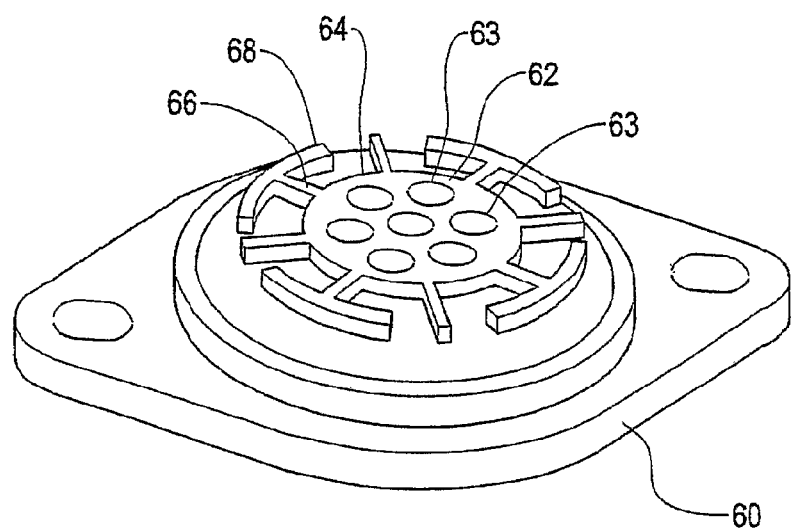
FIG. 3 is perspective view of an exhaust part of the valve of FIG. 2.

Turning next to FIG. 2, a quick release valve according to the present invention is shown generally at 40. The valve 40 is of a generally similar construction to the valve of FIG. 1, having a body 42 with an inlet port 44 leading to an inner chamber 46 and outlet ports 48 located around the periphery of the body 42 in fluid communication with the inner chamber 46. A separate exhaust part 60 is provided, which is received in air-tight engagement in an open part of the body 42 and an exhaust port 62 with a plurality of exhaust apertures 63 located generally opposite (in this instance above) the inlet port 44 in fluid communication with the inner chamber 46. Disposed around the exhaust port 62 are projections 64 (best illustrated in FIG. 3), in the form of a series of ribs 66 which extend radially from the exhaust port 62, some of which have peripheral arc sections 68 at their distal ends, which follow the curvature of the exhaust port. A moveable diaphragm 50, which may be resiliently deformable or may comprise a generally rigid central portion with a resiliently deformable skirt, is disposed within the inner chamber 46 between the inlet port 42 and the exhaust port 62.

In use, the valve 40 is connected as described above, with the inlet port 42 being connected to a driver-controlled source of compressed air, and the outlet ports 48 being connected to brake actuators. The parking brake is disengaged by supplying compressed air to the actuators through the quick release valve 40. The compressed air enters the inner chamber 46 of the valve 40 through the inlet port 44. The pressure of the air causes the diaphragm 50 to move into a position in which it covers and seals the exhaust port 62, where it is supported by the projections 64 on the exhaust part 60. The movement of the diaphragm 50 allows fluid to escape through the outlet ports 48 into the brake actuators, thus to disengage the parking brake.

When the parking brake is required, the supply of compressed air to the quick release valve 40 is halted. The pressure within the inner chamber 46 thus drops, allowing air to enter the inner chamber 46 through the outlet ports 48. This air passes over both a lower face 52 and an upper face 54 of the diaphragm 50. The pressure of the air passing over the lower face 52 of the diaphragm 50 urges the diaphragm 50 towards the exhaust port 62. However, the air passing over the upper face 54 of the diaphragm 50 urges the diaphragm towards the inlet port 44. When the air comes into contact with the projections on the exhaust part 60, turbulence occurs, leading to increased pressure on the upper face 54 of the diaphragm 50. When the pressure on the upper face 54 exceeds the pressure urging the diaphragm 50 towards the exhaust port 62, the diaphragm 50 moves to a position in which it covers and seals the inlet port 44, allowing air from the outlet ports 48 to escape through the exhaust port 62, thus reducing the air pressure in the brake actuators, leading to actuation of the parking brake. The increased pressure on the upper face 54 of the diaphragm 50, caused by the turbulence engendered by the projections 64, leads to a reduction in the time taken for the diaphragm 50 to move from the position in which it seals the exhaust port 62 to the position in which it seals the inlet port 44, thus reducing the delay between the supply of compressed air being halted and the actuation of the parking or emergency brake.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

What is claimed is:

1. A valve comprising an inlet port, an outlet port, an exhaust port and a diaphragm disposed between the inlet and exhaust ports which is moveable, in response to air pressure within the valve, between a first position in which it seals the exhaust port and a second position in which the exhaust port is open, the exhaust port comprising a plurality of exhaust apertures, there being one or more projections associated with the exhaust port on which the diaphragm is able to rest in its first position, wherein the one or more projections are located radially outwardly of the exhaust port and extend axially from an area surrounding the exhaust port, each of the one or more projections comprising a radially oriented rib and an arc section disposed at a radially outward end of the rib.

2. A valve according to claim 1, wherein the exhaust port is located generally opposite the inlet port.

3. A valve according to claim 1, wherein the exhaust port is located above the inlet port.

4. A valve according to claim 1, wherein the diaphragm is resiliently deformable.

5. A valve according to claim 1, wherein the diaphragm comprises a generally rigid central portion with a resiliently deformable skirt.

6. A valve according to claim 1, wherein the diaphragm is generally circular.

7. A valve according to claim 1, wherein the valve comprises two parts, with the inlet port being provided on one part and the exhaust port being provided on the other part.

* * * * *